Oct. 11, 1955  G. B. MARSDEN  2,720,400
GRIPPERS FOR NIPPLES AND THE LIKE
Filed Aug. 1, 1950  3 Sheets-Sheet 3
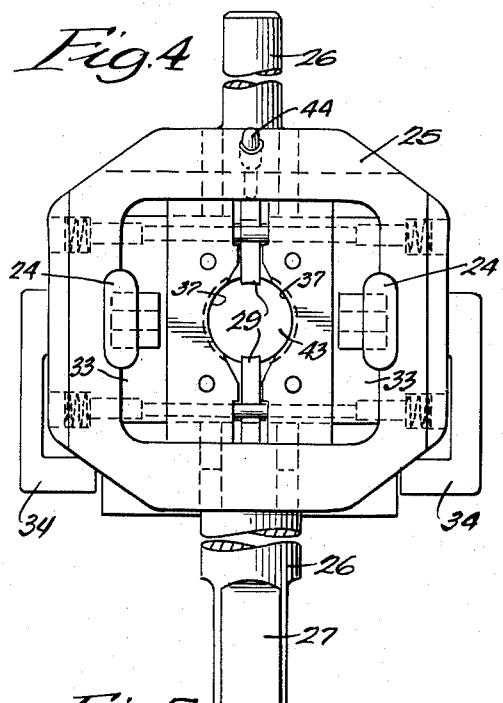
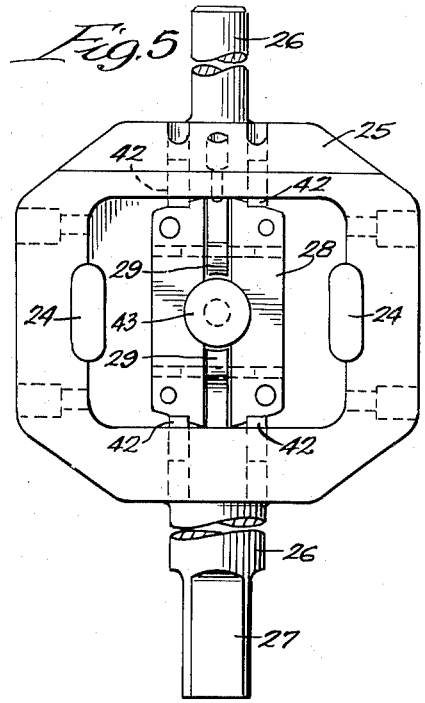
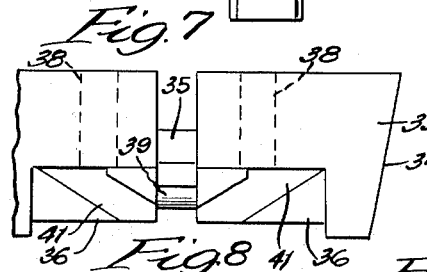
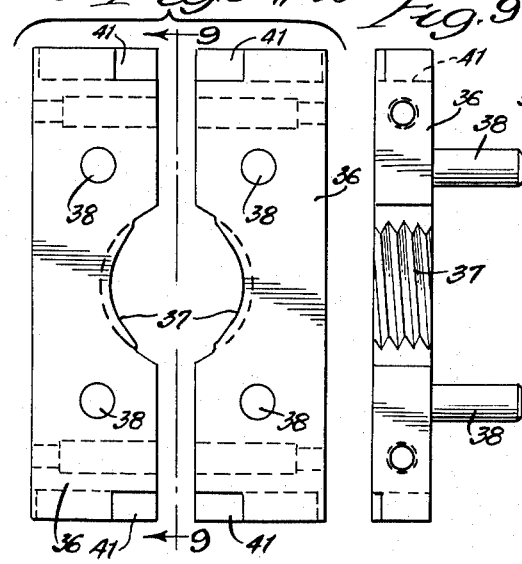
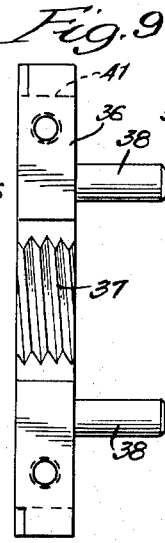
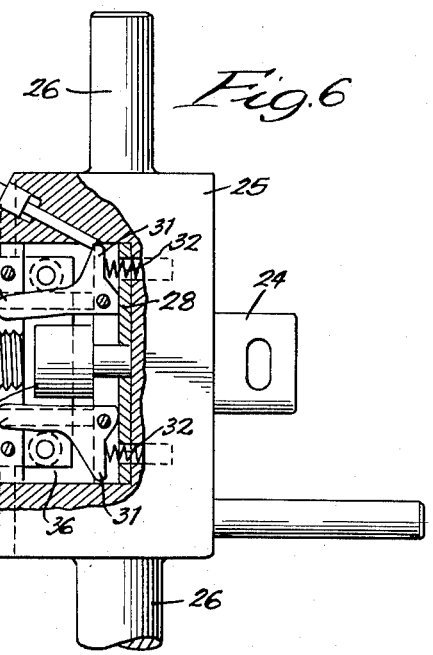
INVENTOR:
George B. Marsden,
BY
E. S. Booth,
ATTORNEY.

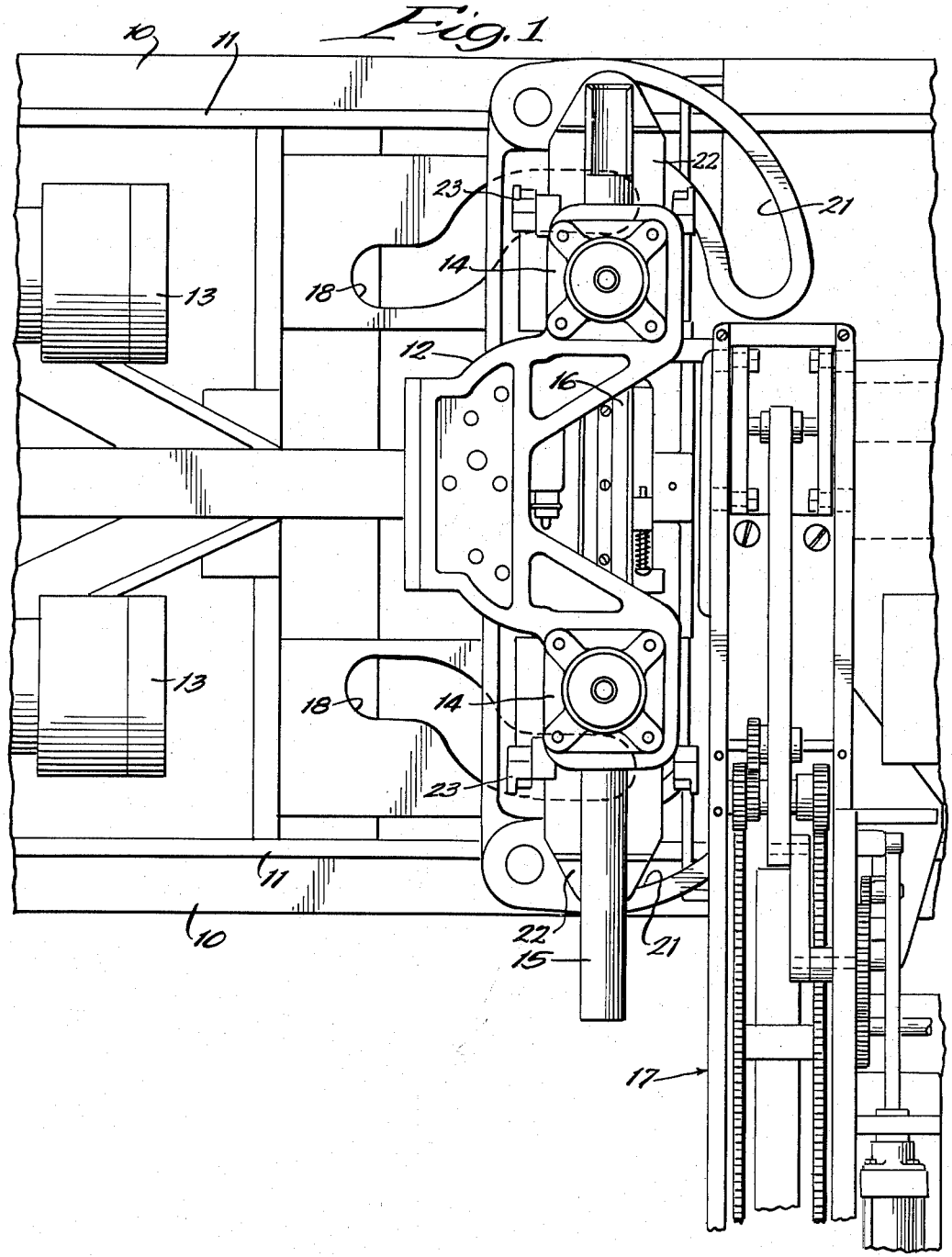

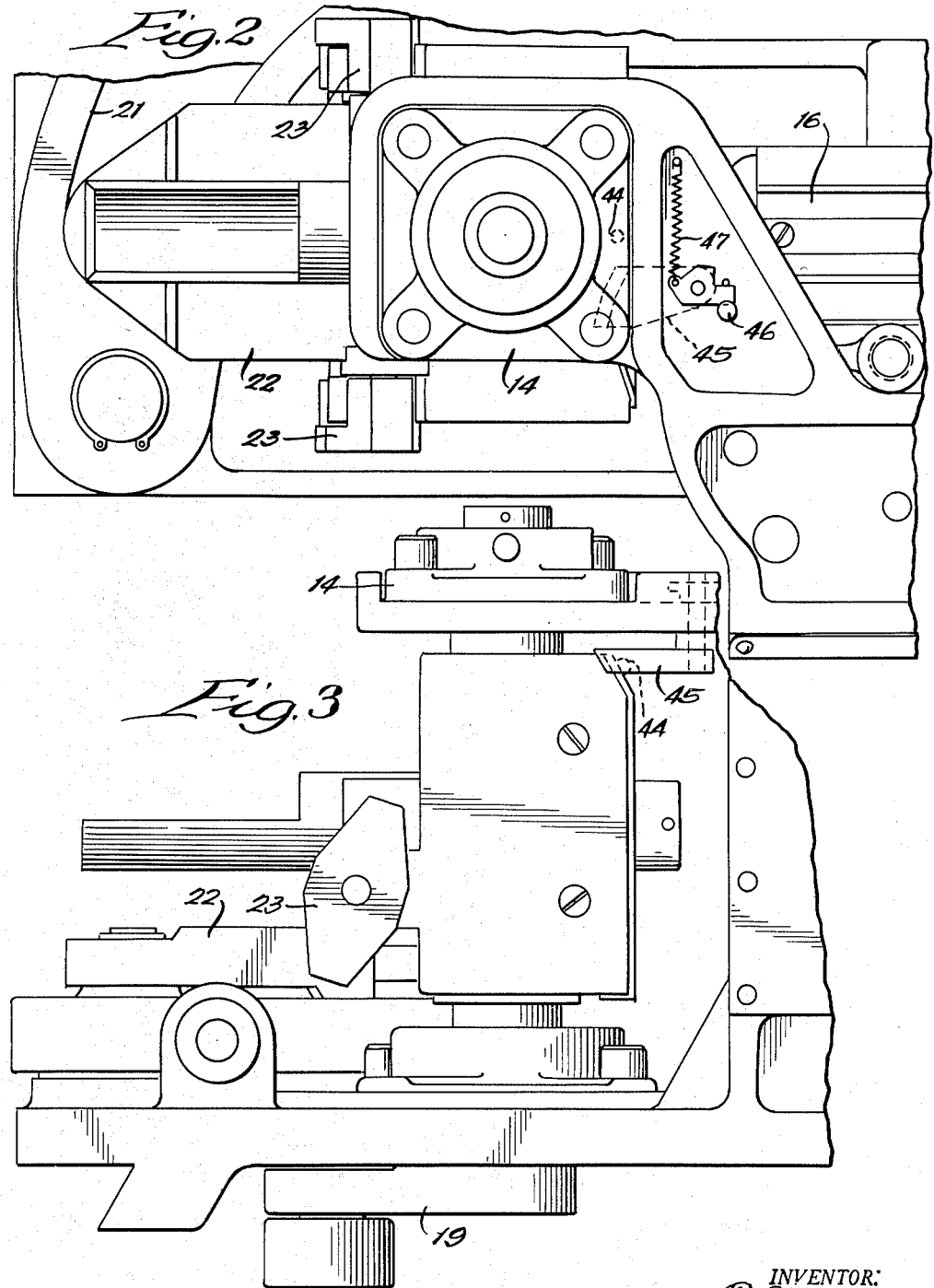

United States Patent Office 2,720,400
Patented Oct. 11, 1955

2,720,400

GRIPPERS FOR NIPPLES AND THE LIKE

George B. Marsden, Chicago, Ill., assignor to Chicago Nipple Manufacturing Co., Chicago, Ill., a corporation of Delaware Application August 1, 1950, Serial No. 176,995

18 Claims. (Cl. 279—1)

This invention relates to grippers for nipples and the like, and more particularly to a chuck for holding nipples and especially the threaded ends of short nipples, in a threading operation.

In my co-pending application, Ser. No. 172,660, filed July 8, 1950, now Patent No. 2,683,272 issued July 13, 1954, there is particularly described and claimed an apparatus for chucking and feeding nipples and like work pieces for threading. The present invention relates to grippers or chucks particularly adapted for use in such apparatus, but also capable of use with other types of machines.

It is one of the objects of the present invention to provide a gripper in which a work piece, such as a nipple, is frictionally held in the gripper until the main jaws engage and grip it. In the preferred construction, pivoted gripping fingers are provided which extend generally along the work piece to receive work pieces from either side of the gripper.

Another object is to provide a gripper in which the gripping fingers can be released freely to release the work piece.

According to one feature of the invention, a pair of fingers are employed and only one of the pair is released so that the other finger assists in pushing the work piece out of the main jaws.

Another object is to provide a gripper in which the gripper body is mounted for turning movement and the releasing means is operated by turning of the body toward its loading or feeding position.

Still another object is to provide a gripper in which a threaded work piece is engaged by jaws formed with gripping surfaces having thread segments thereon, and the jaws are given a compound movement toward gripping position parallel to the blanks of the threads. This enables the jaws to grip the threads without damage.

According to one feature of the invention, the threaded work piece is held relatively loosely by the jaws to thread in against a fixed stop during the cutting operation; thus it insures accurate positioning of the work piece in the gripper.

The above and other objects and advantages of the invention will be more readily apparent from the following description when read in connection with the accompanying drawings, in which Figure 1 is a partial plan view of a threading machine embodying the invention;

Figure 2 is an enlarged partial plan showing one of the grippers;

Figure 3 is a side elevation of a gripper;

Figure 4 is a front elevation of a gripper;

Figure 5 is a view similar to Figure 4 with the jaws removed;

Figure 6 is a partial section through a gripper, and

Figures 7, 8 and 9 are top, front and side views respectively of sets of gripping jaws.

The machine as shown in Figure 1 is of the type more particularly described and claimed in my co-pending application, Ser. No. 172,660, filed July 8, 1950, now Patent No. 2,683,272 issued July 13, 1954, for feeding nipples and similar work pieces toward and away from conventional threading chasers. The machine as illustrated, comprises a frame 10 formed at its sides with ways 11 on which a carriage 12 is slidable. As shown in the drawing, the carriage is in its feeding position and may be moved to the left toward rotating chasers 13 for threading work pieces carried by chucks or grippers on the carriage.

The carriage carries a pair of grippers or chucks 14 which are adapted to hold the work pieces and which are mounted on the carriage for turning movement about vertical axes. The lower chuck or gripper receives work pieces through a feeding tube 15 carried thereon, and a work piece, one end of which has been threaded, is transferred from the lower to the upper chuck through a transfer trough 16 lying between the chucks. A feeding mechanism indicated generally at 17 and which is more fully described and claimed in my co-pending application referred to above, forces work pieces into the lower chuck 14 through its feeding tube 15 and across the transfer trough 16 in to the upper chuck 14.

As the carriage moves toward the chasers, the grippers or chucks are turned by means of cam tracks 18 formed in the frame and receiving rollers carried by arms 19 rigid with the grippers or chucks. As the carriage moves, the grippers will be swung to a parallel position in alignment with the chasers 13 to feed the work pieces into the chasers for a threading operation. Upon completion of the threading operation, the carriage will return to its feeding position shown for ejection of the completed work pieces and feeding of new work pieces.

During the turning operation, the main gripping jaws in the grippers are caused to engage the work pieces by means of cam tracks 21 on the carriage which are engaged by rollers at the ends of links 22.

As best seen in Figure 3, the links 22 are connected to the lower ends of levers 23 whose upper ends are connected to cam bars 24 extending from the grippers. The cam tracks 21 are so shaped that when the grippers turn toward their cutting positions, the links 22 will be pushed inward to pull on the cam bars 24 to cam the main gripper jaws into engagement.

The grippers themselves, as best shown in Figures 4 to 9, comprise a hollow body 25 having pivoted rods 26 extending from its opposite ends for pivotally mounting the body on the carriage. Preferably the end of the lower pivot rod is squared as shown at 27, to carry the arm 19 through which the body is turned. The body is formed with a generally rectangular opening in its front end in which the jaw mechanism is mounted, and is provided with a central bore completely therethrough with which the feeding tube 15 registers. The cam bars 24 extend through slots in the side portions of the body and may be slit longitudinally in the body by the operating mechanism described above.

At the inner side of the recess in the body, a plate 28 is mounted which may be carried by or secured to the feed tube 15. The plate 28 is formed with a pair of grooves diametrically opposite to the center opening and friction gripping fingers 29 are pivoted in the grooves. As shown in Figure 6, each finger is pivoted at its inner end to the plate 28 and extends outward therefrom generally parallel to the axis of a work piece in the gripper. Each finger is formed with an outwardly extending ear 31 which is engaged by a compression spring 32 carried in the gripper body to urge the free ends of the fingers inward. With this construction a work piece can be forced between the fingers from either side of the gripper body and will be frictionally held thereto until the main jaws engage the work piece.

The main jaws as best seen in Figures 7, 8 and 9, comprise supporting blocks 33 which fit in the gripper body for linear sliding movement toward and away from each other. Each of the blocks 33 has a tapered outer cam surface 34 to be engaged by the web members 24 so that the blocks will be moved toward each other to gripping position when the cams are pulled inward in the body. The blocks may be slidably connected by guide pins 35 to initial alignment thereof.

Each block carries a gripper jaw 36 which is formed on its inner surface with a gripping portion having a series of segmental threads 37 thereon. The threads 37 are made to be complementary to the threads of a work piece to be threaded so that the threads on the work piece can be gripped without damage. The jaws 36 carry guide pins 38 which fit slidably into openings in the blocks 33 so that the jaws will be moved laterally with the blocks but can slide longitudinally relative to the blocks. The jaws are also preferably connected by transverse pins 39 to insure proper alignment of the jaws.

According to one of the important features of the present invention, the jaws are given a compound movement as they move in toward gripping position which is generally parallel to the flanks of the threads on the work piece. For this purpose, each jaw is formed at its ends with an angularly extending cam or guide slot 41 and the body is provided with guide pins 42 to extend into the slots 41.

With this construction, as the blocks and jaws are moved toward each other by the cam bars 24, the jaws will be moved longitudinally of the work piece so that the thread segments 37 thereon can slide smoothly into the threads on the work piece without marring the threads.

With this type of movement, the work piece may be moved out of the chuck slightly. To insure proper positioning of the work piece in the chuck, a stop block 43 is mounted in the chuck to be engaged by the end of the work piece thereby to limit inward movement of the work piece into the chuck. When the threading operation commences on a work piece, unless it is seated against the stop block 43, it will be threaded inward in the segments 37 until its end abuts the stop block 43. The jaws grip the work piece with sufficient pressure to prevent slipping during threading but will still permit the work piece to turn until it engages the stop block. In this way the position of the work piece in the chuck is accurately determined and each work piece will project the same desired distance from the chuck.

At the completion of a threading operation especially on short nipples, it is desired to release the friction fingers 29 so that the completed nipple can be ejected from the front end of the gripper. For this purpose, a release pin 44 is slidably mounted in the body in a position to engage the projecting ear 31 of the upper gripping finger only. When the pin 44 is pressed inward, it will rock the upper gripping finger away from the work piece without affecting the lower finger. Thus at this time, the lower finger will tend to press the work piece upwardly to assist in releasing it from the jaws and to insure its ejection from the gripper.

The release pin 44 is operated as best seen in Figures 2 and 3, by a cam lever 45 which is pivoted on the carriage adjacent the upper end of the gripper. The lever 45 is formed at one end with a cam surface to engage the pin 44 and a stop pin 46 is provided to limit swinging movement of the cam lever 45 in one direction. A spring 47 urges the cam lever in a direction to engage the stop pin but is yieldable to permit the cam lever to swing in the opposite direction.

The cam lever is so arranged that when the gripper is turning from its loading position as shown in Figure 1, to its threading position the cam lever will swing out of the way without affecting the friction gripping fingers. On the return movement, when the grippers are swinging back toward their feeding position the cammed lever will be held against swinging by the pin 46 and will press inward on the releasing pin 44 to release the upper friction finger and enable the completed nipple to be ejected.

The machine operates for threading short nipples in basically the same manner as described in my co-pending application referred to above. The gripper jaws in the lower gripper 14 need not be provided with threads and need not have the compound movement referred to, since they are always gripping plain work pieces. Also, the stop member 43 is omitted in the lower gripper so that work pieces can be forced into the gripper from the back thereof through the feed tube 15.

As a work piece is forced into the lower gripper, it will be frictionally engaged by the fingers 29 and will be held by the fingers during turning of the gripper until the main jaws engage it. At the same time that a work piece is forced into the lower gripper, the threaded end of a nipple is forced from the lower gripper through the transfer trough into the upper gripper. The friction fingers 29 in the upper gripper will hold this work piece properly in place until its threads are engaged by the thread segments 37 on the upper gripper jaws.

At the completion of the threading operation when the carriage returns to its feeding position, the completed nipple will be released by the upper gripper and will drop from the forward end thereof.

It will be apparent that the operation can be carried out continuously and that due to the construction of the upper gripper jaws, the threaded ends of even extremely short nipples can be accurately gripped without the danger of damage to the threads.

While the invention has been shown and described in connection with one particular construction, it will be apparent that the scope of the invention is not to be limited to this exact construction nor otherwise than by the terms of the appended claims.

What is claimed is:

1. A gripper for nipples and the like, comprising a hollow body, a pair of jaws in the body movable diametrically toward and away from each other to grip a nipple or the like between them, fingers movably mounted in the body between the adjacent sides of the jaws for radial movement toward a nipple in the jaws, and springs in the body engaging the fingers and urging them radially inward.

2. A gripper for nipples and the like, comprising a hollow body, a plurality of jaws in the body movable toward and away from each other to grip a nipple or the like between them, elongated fingers pivoted in the body inward of the jaws and extending toward the jaws with their free ends lying between the sides of the jaws, and spring means in the body engaging the fingers and urging their ends radially inward.

3. A gripper for nipples and the like, comprising a hollow body, a plurality of jaws in the body movable toward and away from each other to grip a nipple or the like between them, gripper fingers mounted in the body between the sides of the jaws for radial movement toward and away from a nipple in the jaws, spring means urging the fingers radially inward, and releasing means extending into the body and engaging at least one of the fingers to move it radially outward.

4. A gripper for nipples and the like, comprising a hollow body, a plurality of jaws in the body movable toward and away from each other to grip a nipple or the like between them, elongated fingers pivoted in the body inward of the jaws and extending toward the jaws with their free ends lying between the sides of the jaws, spring means in the body engaging the fingers and urging their ends radially inward, and a releasing pin extending into the body and engaging at least one of the fingers to swing its end radially outward.

5. A gripper for nipples and the like, comprising a hollow body, a pair of jaw members in the body slidable linearly toward and away from each other to grip a nipple or the like between them, a pair of fingers mounted in the body between the jaw members for radial movement, and spring means urging the fingers radially inward.

6. A gripper for nipples and the like, comprising a hollow body, a pair of jaw members in the body slidable linearly toward and away from each other to grip a nipple or the like between them, a pair of fingers mounted in the body between the jaw members for radial movement, spring means urging the fingers radially inward, and releasing means engaging one only of the fingers to move it radially outward.

7. A gripper for nipples and the like, comprising a hollow body, a pair of jaw members in the body slidable linearly toward and away from each other to grip a nipple or the like between them, a pair of elongated fingers pivoted in the body and extending toward the jaw members with their free ends lying between the jaw members, and spring means acting on the grippers to urge their free ends radially inward.

8. A gripper for nipples and the like, comprising a hollow body, a pair of jaw members in the body slidable linearly toward and away from each other to grip a nipple or the like between them, a pair of elongated fingers pivoted in the body and extending toward the jaw members with their free ends lying between the jaw members, spring means acting on the grippers to urge their free ends radially inward, and a releasing pin engaging one only of the fingers to swing its free end radially outward.

9. A gripper for threaded nipples and the like, comprising a hollow body, a stop fixed in the body engageable with a nipple to limit movement thereof into the body, a plurality of jaws in the body movable toward and away from each other, the jaws having inner gripping surfaces formed with thread segments to interfit with threads on a nipple, the jaws having inclined cam tracks at their ends, and pins on the body fitting in the cam tracks to shift the jaws lengthwise of the nipple as they move together.

10. A gripper for threaded nipples and the like, comprising a hollow body, a plurality of jaws in the body movable toward and away from each other, the jaws having inner gripping surfaces formed with thread segments to interfit with threads on a nipple, cooperating guide parts on the jaws and the body to shift the jaws lengthwise of the nipple as they move together, fingers mounted in the body between the sides of the jaws for radial movement toward a nipple in the jaws, and spring means urging the fingers radially inward.

11. A gripper for threaded nipples and the like, comprising a hollow body, a plurality of jaws in the body movable toward and away from each other, the jaws having inner gripping surfaces formed with thread segments to interfit with threads on a nipple, cooperating guide parts on the jaws and the body to shift the jaws lengthwise of the nipple as they move together, fingers mounted in the body between the sides of the jaws for radial movement toward a nipple in the jaws, spring means urging the fingers radially inward, and releasing means engaging at least one of the fingers to move it radially outward.

12. A gripper for threaded nipples and the like, comprising a hollow body, a stop fixed in the body engageable with a nipple to limit movement thereof into the body, a pair of jaws in the body, means to move the jaws together to grip a threaded nipple or the like between them, the jaws having inner gripping surfaces formed with thread segments to interfit with threads on the nipple, and cooperating guide parts on the jaws and the body to shift the jaws longitudinally of the nipple as they move inward.

13. A gripper for threaded nipples and the like, comprising a hollow body, a pair of jaws in the body, means to move the jaws together to grip a threaded nipple or the like between them, the jaws having inner gripping surfaces formed with thread segments to interfit with threads on the nipple, cooperating guide parts on the jaws and the body to shift the jaws longitudinally of the nipple as they move inward, a pair of fingers in the body between the sides of the jaws frictionally to grip a nipple between the jaws, and spring means urging the fingers radially inward.

14. A gripper for threaded nipples and the like, comprising a hollow body, a pair of jaws in the body, means to move the jaws together to grip a threaded nipple or the like between them, the jaws having inner gripping surfaces formed with thread segments to interfit with threads on the nipple, cooperating guide parts on the jaws and the body to shift the jaws longitudinally of the nipple as they move inward, a pair of fingers in the body between the sides of the jaws frictionally to grip a nipple between the jaws, spring means urging the fingers radially inward, and a releasing pin engaging one only of the fingers to move it radially outward.

15. A gripper for nipples and the like, comprising a hollow body, means mounting the body for turning movements about an axis, jaws in the body to grip a nipple or the like with its axis transverse to said turning axis, means operated by turning of the body in one direction to move the jaws in to gripping position and by turning of the body in the other direction to release the jaws, friction gripping fingers in the body to engage a nipple or the like inserted between the jaws, spring means urging the fingers inward to gripping position, a releasing pin engaging at least one of the fingers to move it outward, and means to operate the releasing pin as the body turns in said other direction.

16. A gripper for nipples and the like, comprising a hollow body, means mounting the body for turning movements about an axis, jaws in the body to grip a nipple or the like with its axis transverse to said turning axis, means operated by turning of the body in one direction to move the jaws in to gripping position and by turning of the body in the other direction to release the jaws, friction gripping fingers in the body to engage a nipple or the like inserted between the jaws, spring means urging the fingers inward to gripping position, a releasing pin engaging at least one of the fingers to move it outward, a cam engageable with the releasing pin to operate it, means mounting the cam for free movement in the direction it is urged by the pin when the body turns in said one direction, and means to prevent movement of the cam in the other direction.

17. A gripper for threaded nipples and the like, comprising a hollow body mounted for turning about a vertical axis, a pair of jaws in the body, means to move the jaws together to grip a threaded nipple or the like between them with its axis transverse to said turning axis, the jaws having gripping surfaces formed with thread segments complementary to the threads on the nipple, guide parts on the jaws and body to shift the jaws longitudinally of the nipple as they move inward, a pair of fingers pivoted in the body with their free ends lying between the jaws, spring means urging the fingers in a direction to move their free ends inward, a releasing pin slidable in the body and engaging one only of the fingers to move it outward, and a cam engageable with the pin to operate it when the body is turning in one direction about its axis.

18. A gripper for threaded nipples and the like comprising a supporting body open at one end to receive a threaded nipple, a stop fixed in the body to engage a nipple and limit movement thereof into the body, a pair of jaws slidably mounted in the body on diametrically opposite sides of a nipple in the open end of the body, the jaws having inner gripping surfaces formed with thread segments to interfit with threads on the nipple, cooperating guide surfaces on the jaws and the body at least some of which lie at an acute angle to the nipple axis to move the jaws axially outward of the open end of the body as the jaws move radially together into gripping engagement with a nipple, and operating means to urge the jaws radially together.

References Cited in the file of this patent

UNITED STATES PATENTS

| Number | Name | Date |
|---|---|---|
| 409,108 | Leighton | Aug. 13, 1889 |
| 540,989 | Keyes | June 11, 1895 |
| 698,718 | Leas | Apr. 29, 1902 |
| 1,006,190 | Estell et al. | Oct. 17, 1911 |
| 1,326,075 | McGee et al. | Dec. 23, 1919 |
| 1,499,701 | Skeel | July 1, 1924 |
| 1,697,532 | Lilleberg | Jan. 1, 1929 |
| 2,394,118 | Thornhill | Feb. 5, 1946 |
| 2,637,051 | Marsden | May 5, 1953 |

FOREIGN PATENTS

| Number | Country | Date |
|---|---|---|
| 1,086 | Great Britain | Jan. 16, 1896 |